(12) United States Patent
Vayssiere et al.

(10) Patent No.: US 11,912,402 B2
(45) Date of Patent: Feb. 27, 2024

(54) ROTARY WING AIRCRAFT WITH A FIREWALL ARRANGEMENT

(71) Applicant: AIRBUS HELICOPTERS DEUTSCHLAND GMBH, Donauworth (DE)

(72) Inventors: Aurelien Vayssiere, Niederschoenenfeld GT Feldheim (DE); Hubert Neukirch, Dilligen (DE); Markus Kammerer, Alerheim (DE); Bernhard Rein, Rain Am Lech (DE)

(73) Assignee: AIRBUS HELICOPTERS DEUTSCHLAND GmbH, Donauworth (DE)

( * ) Notice: Subject to any disclaimer, the term of this patent is extended or adjusted under 35 U.S.C. 154(b) by 0 days.

(21) Appl. No.: 17/666,317

(22) Filed: Feb. 7, 2022

(65) Prior Publication Data

US 2022/0332411 A1 Oct. 20, 2022

(30) Foreign Application Priority Data

Apr. 9, 2021 (EP) ..................................... 21400008

(51) Int. Cl.
*B64C 27/00* (2006.01)
*B64C 1/12* (2006.01)
(Continued)

(52) U.S. Cl.
CPC .............. *B64C 27/006* (2013.01); *B64C 1/12* (2013.01); *B64C 27/00* (2013.01); *B64D 27/26* (2013.01);
(Continued)

(58) Field of Classification Search
CPC .. B64D 27/26; B64D 45/00; B64D 2045/009; B64C 27/006; B64C 1/12; B64C 1/40;
(Continued)

(56) References Cited

U.S. PATENT DOCUMENTS 9,868,545 B2 1/2018 Brochard et al.
10,435,136 B2 10/2019 Poster
(Continued)

FOREIGN PATENT DOCUMENTS

EP 0900346 B1 9/2002
EP 1482228 A1 12/2004
(Continued)

OTHER PUBLICATIONS

European Search Report for European Application No. EP 21400008.5, Completed by the European Patent Office, dated Sep. 13, 2021, 5 pages.

*Primary Examiner* — Richard Green
*Assistant Examiner* — Steven J Shur
(74) *Attorney, Agent, or Firm* — Brooks Kushman P.C.

(57) ABSTRACT

A rotary wing aircraft with a fuselage that forms an aircraft interior region, the fuselage comprising an upper primary skin that separates the aircraft interior region from an aircraft upper deck arranged above the fuselage, wherein the aircraft upper deck comprises an engine accommodating region with a firewall arrangement, the engine accommodating region accommodating at least one aircraft engine within the firewall arrangement, wherein the firewall arrangement comprises at least one gasket for tightening pass-through of a torque tube that connects the at least one aircraft engine to a main gear box of the rotary wing aircraft, and wherein the at least one gasket comprises at least two fire proof shells and a ring-shaped flexible fire proof bellows.

20 Claims, 5 Drawing Sheets

(51) Int. Cl.
  *B64D 27/26* (2006.01)
  *B64D 45/00* (2006.01)
  *B64C 27/06* (2006.01)

(52) U.S. Cl.
  CPC .............. *B64D 45/00* (2013.01); *B64C 27/06* (2013.01); *B64D 2045/009* (2013.01)

(58) Field of Classification Search
  CPC .......... B64C 27/04; B64C 1/061; B64C 1/06; B64C 1/062; B64C 1/064; B64C 1/068; B64C 27/00; F16J 3/042; F16J 15/065; F16J 15/0893; F16J 15/104; F16J 15/363; F16J 15/36; F16J 15/52
  USPC .................................................... 403/50, 464
  See application file for complete search history.

(56) References Cited

U.S. PATENT DOCUMENTS

| | | | |
|---|---|---|---|
| 2007/0257442 A1* | 11/2007 | Mast | ................. F01D 25/30 277/391 |
| 2009/0314899 A1 | 12/2009 | Porte et al. | |
| 2012/0082808 A1 | 4/2012 | Lemains et al. | |
| 2014/0133964 A1 | 5/2014 | Ayle | |
| 2015/0291288 A1* | 10/2015 | Bofill | ..................... B64D 33/02 137/15.1 |
| 2016/0215885 A1* | 7/2016 | Duncan | ................... F16L 23/18 |
| 2018/0156131 A1 | 6/2018 | Olson | |
| 2020/0400250 A1 | 12/2020 | Wilde et al. | |
| 2021/0023928 A1* | 1/2021 | Appleby | ................... F02C 7/28 |

FOREIGN PATENT DOCUMENTS

| | | |
|---|---|---|
| EP | 2046638 B1 | 9/2010 |
| EP | 2443034 B1 | 9/2015 |
| EP | 3056423 A1 | 8/2016 |
| EP | 3131817 A1 | 2/2017 |
| EP | 2917532 B1 | 4/2019 |
| EP | 3556661 A1 | 10/2019 |
| WO | 1997004838 A1 | 2/1997 |
| WO | 2015160679 A1 | 10/2015 |

\* cited by examiner

ROTARY WING AIRCRAFT WITH A FIREWALL ARRANGEMENT

CROSS-REFERENCE TO RELATED APPLICATIONS

This application claims priority to European patent application No. EP 21400008.5 filed on Apr. 9, 2021, the disclosure of which is incorporated in its entirety by reference herein.

TECHNICAL FIELD

The present disclosure is related to a rotary wing aircraft with a fuselage that forms an aircraft interior region, the fuselage comprising an upper primary skin that separates the aircraft interior region from an aircraft upper deck arranged above the fuselage, wherein the aircraft upper deck comprises an engine accommodating region with a firewall arrangement.

BACKGROUND

In a rotary wing aircraft, such as a small or medium-size helicopter, an associated fuselage typically comprises an upper primary skin that separates an aircraft interior region, which is formed by the fuselage, from an aircraft upper deck arranged above the fuselage. The aircraft interior region usually accommodates at least a cockpit and may further accommodate a cabin for passengers and/or cargo.

The aircraft upper deck generally includes an engine accommodating region that accommodates one or more engines, typically air breathing gas turbines, and that is, therefore, also referred to as the "engine deck". Typically, the one or more engines are arranged on the engine deck outside of the aircraft interior region, on top of the fuselage and close to the other main components of a respective powerplant, the main gear box and the main rotor.

The one or more engines are generally adapted for driving the rotary wing aircraft by providing power to a suitable propelling unit, such as e.g., the main rotor, propeller or other. More specifically, power of the one or more engines is transmitted to an associated power distribution unit, such as a main gear box of the rotary wing aircraft, which then provides the power to the suitable propelling unit. For instance, the power is transmitted from a given engine to a respective main gear box via an associated torque tube.

According to airworthiness certification regulations, the engine deck of a given rotary wing aircraft must be fire proof in a fire event. Therefore, the engine deck as a whole is usually equipped with a suitable firewall arrangement which forms a fire protection zone. The fire protection zone accommodates the engines within the firewall arrangement such that the firewall arrangement defines a fire proof separation between the engines, towards the forward and aft regions of the engine deck, and the aircraft interior region formed by the fuselage of a given rotary wing aircraft. The firewall arrangement is further provided to guarantee a required flammable fluids tightness and to protect a respective environmental control system, a main gear box, and flight controls of the given rotary wing aircraft.

More specifically, a firewall arrangement in an engine deck usually comprises a front firewall as well as a rear firewall, and is typically delimited by the upper primary skin of the fuselage that forms a lower firewall, as well as by a cowling that represents an upper loft of a given rotary wing aircraft and covers the engine deck. The front and rear firewalls as such are designed to increase the stability of a respective aircraft upper deck secondary structure and to keep a covering cowling in position while the cowling is providing stiffness to the firewalls. The cowling in turn forms a protection of the engine deck and, more generally, of the aircraft upper deck against the external environment of a given rotary wing aircraft as, in closed state, the cowling covers all installations and equipment located on the aircraft upper deck. Furthermore, the cowling improves a respective aerodynamic behavior of the given rotary wing aircraft due to an underlying shaping, thus, reducing aerodynamic drag, while carrying and transferring all occurring flight loads to a given aircraft primary structure, i.e., a given aircraft airframe. Moreover, the cowling supports and withstands also other loads, such as loads of a given conditioning and ventilation system, air intake protection grids, an engine plenum, and engine exhaust nozzles of the rotary wing aircraft.

If the rotary wing aircraft is a twin-engine aircraft, both engines are usually separated from each other by a center or mid firewall of the firewall arrangement for protecting both engines from each other, such that each engine is arranged in a separate and independently closed engine compartment. Usually, in such a firewall arrangement the respective front and rear firewalls, as well as mid firewalls, if any, are secondary parts which are typically made of titanium sheet. A typical thickness of such a titanium sheet amounts to 1.2 mm, although fire resistance is already deemed to be achieved with a minimum thickness of 0.4 mm.

In any case, the engine(s) of a given rotary wing aircraft is (are) attached to the upper primary skin and corresponding framework members such as beams or frames by means of several engine mounts, and certain parts of the firewall arrangement are generally removable in order to enable access to the engine(s) or other mechanical parts, e.g., in a maintenance phase. The front firewall and the rear firewall represent a barrier to respective front and rear portions of a given aircraft upper deck. The cowling is usually at least partially removable to provide access to the engines, e.g., for maintenance purposes.

Exemplary firewall arrangements are described in the documents EP 2 046 638 B1, EP 2 443 034 B1, EP 2 917 532 B1, US 868 545 B2, and US 2018/0156131 A1. Documents EP3131817, EP1482228 and US2020400250 were cited.

More particularly, the document EP 3 056 423 A1 describes a rotary wing aircraft with a fuselage that defines at least an interior region and an engine accommodating region that is arranged inside of the fuselage and comprises at least one fire protection zone that is defined by at least one associated firewall arrangement. The at least one fire protection zone accommodates at least one engine within the at least one associated firewall arrangement such that the associated firewall arrangement defines a fire-resistant separation between the at least one engine and the interior region of the fuselage. The at least one associated firewall arrangement comprises a plurality of interconnected firewalls that delimit the at least one fire protection zone, including a front firewall, a rear firewall, a lower firewall, and a mid firewall.

In summary, a given firewall arrangement ensures an air, water, and fluid tight separation of each associated engine compartment. Remaining gaps between mobile and fixed parts on the engine deck are hermetically sealed with suitable fire proof seals and/or gaskets. Respective gaskets are e.g., used to tighten pass-through of associated torque tubes that connect given engines to a respective main gear box of a given rotary wing aircraft. More particularly, the gaskets are provided to form flammable fluids barriers, as well as fire proof segregations and thermal isolations of the associated torque tubes from the given engines.

Gaskets in general that are more or less provided to surround associated tubes for forming thermal and/or fire barriers are e.g., described in the documents U.S. Pat. No. 10,435,136 B2, EP 0 900 346 B1, and WO 1997/004838 A1.

The document EP 3 556 661 A1 in turn describes a rotary wing aircraft with an engine compartment that accommodates an aircraft engine and that is provided with a firewall arrangement that includes a front firewall and a gasket. A torque tube, i.e., driveshaft assembly, couples the aircraft engine to an associated reduction gearbox assembly. The torque tube is at least partly arranged in a flexible seal component that is integrated into the front firewall and that forms the gasket. The flexible seal component is configured so as to accommodate movement of the aircraft engine relative to an inlet aperture formed in the front firewall and may be fabricated of neoprene having fiberglass cloth embedded therein and/or silica and/or other flexible fire proof material(s).

However, during maintenance of a given rotary wing aircraft and its aircraft engine(s), a respective torque tube must be fully accessible in order to allow verification and checking of all connections, fasteners and so on. Therefore, removal of an associated gasket that surrounds the respective torque tube is mandatory. Such a removal is, nevertheless, generally only possible by dismounting of the torque tube from an associated main gear box, untightening and detaching of the aircraft engine(s), and displacing of the aircraft engine(s) relative to the associated gasket. This is, however, a very time consuming and critical operation.

SUMMARY

It is, therefore, an object of the present disclosure to provide a new rotary wing aircraft having a firewall arrangement with a gasket that enables full accessibility of an associated torque tube during maintenance. This object is solved by a rotary wing aircraft having the features of claim 1.

More specifically, according to the present disclosure a rotary wing aircraft with a fuselage that forms an aircraft interior region is provided, wherein the fuselage comprises an upper primary skin that separates the aircraft interior region from an aircraft upper deck arranged above the fuselage. The aircraft upper deck comprises an engine accommodating region with a firewall arrangement. The engine accommodating region accommodates at least one aircraft engine within the firewall arrangement such that the firewall arrangement defines a fire proof separation and a flammable fluids tightness at least between the at least one aircraft engine and the aircraft interior region. The firewall arrangement comprises at least one gasket for tightening pass-through of a torque tube that connects the at least one aircraft engine to a main gear box of the rotary wing aircraft. The at least one gasket comprises at least two fire proof shells that are removably attached to each other to form a tube-shaped structure, and a ring-shaped flexible fire proof bellows that is mounted to the at least two fire proof shells and configured to compensate movements of the torque tube relative to the firewall arrangement.

Preferably, the firewall arrangement defines a fire proof separation and a flammable fluids tightness not only between the at least one aircraft engine and the aircraft interior region, but more generally between the at least one aircraft engine and all other adjacent aircraft regions. Such other adjacent aircraft regions include the aircraft interior region, as well as forward and aft regions to the engine accommodating region, such as e.g., gearbox or exhaust accommodating regions. The firewall arrangement may comprise a front firewall, a rear firewall, and a mid firewall.

Advantageously, the firewall arrangement allows to fully eliminate damage on the fuselage, which forms the rotary wing aircraft's primary structure, in a fire case by confining it within secondary protection elements, i.e., the firewall arrangement, within respective engine accommodating compartments. Thus, any repair actions on the aircraft's primary structure after a fire may be eliminated or at least reduced to a minimum.

Furthermore, by providing the firewall arrangement with the at least one gasket that tightens pass-through of an associated torque tube, a fire proof segregation and thermal isolation of the associated torque tube from the at least one engine, as well as a flammable fluids barrier between the associated torque tube and the at least one engine may advantageously be provided. The at least one gasket may be removably attached to the firewall arrangement by means of associated quick release fasteners, in particular quick release quarter turn fasteners.

Advantageously, the at least one gasket is retrofittable and may easily and comfortably be mounted to or removed from the associated torque tube by detaching the ring-shaped flexible fire proof bellows from the at least two fire proof shells, and by detaching the at least two fire proof shells from each other. Thus, untightening, detaching and displacing of the at least one aircraft engine as described above may beneficially be avoided, therefore, securing and speeding up e.g., respective maintenance operations.

Preferably, at least one gasket is composed of two semi cylindrical shells and one flexible bellows. The flexible bellows may be attached to an associated counterpart of the at least one aircraft engine by means of mushroom head pins. By way of example, the two semi cylindrical shells may be removably attached to each other by means of associated shell clamps. This allows disassembling the gasket without impacting the at least one aircraft engine. Advantageously, such a gasket sustains fire and secures a full fluids tightness. Furthermore, heat transfer of such a gasket avoids any high temperature at the surface of the associated torque tube.

By way of example, the semi cylindrical shells are semi cylindrical titanium shells and the flexible bellows is sewed out of an outer layer of silicone coated glass fiber fabric according to ECS7229 and an inner layer of silicate glass fiber fabric according to ECS7241. The ECS7229 fabric is only coated on one side with silicone which is preferably oriented toward the at least one engine and, therefore, arranged on a side of the flexible bellows that will be exposed to fire in the case of an engine fire. The flexible bellows may be fitted with an inner and an outer titanium ring, or stainless steel ring, at both extremities in its axial direction. Furthermore, the flexible bellows may be sewed with a coated stainless-steel yarn 13/2-MEZ-HELIOS to achieve a hollow tube shape. Preferably, the flexible bellows overlaps with the semi cylindrical shells in the axial direction of the gasket, instead of merely butting against the semi cylindrical shells. In fact, such an overlapping joint exhibits an improved robustness against burn-through compared to a butting joint.

According to one aspect, the at least one gasket forms a flammable fluids barrier and is configured to provide a fire proof segregation and thermal isolation of the torque tube from the at least one engine.

According to one aspect, at least one of the at least two fire proof shells comprises titanium.

According to one aspect, the at least one of the at least two fire proof shells is a semi-cylindrical titanium shell.

According to one aspect, the ring-shaped flexible fire proof bellows comprises a fiber reinforced fabric.

According to one aspect, the fiber reinforced fabric comprises at least one silicone coated glass fiber fabric layer.

According to one aspect, the fiber reinforced fabric comprises at least one silicate glass fiber fabric layer.

According to one aspect, the ring-shaped flexible fire proof bellows comprises at least two metal rings to form a ring-shaped bellows structure.

According to one aspect, at least one of the at least two metal rings is removably mounted to the at least two fire proof shells via associated fasteners, in particular rivets.

According to one aspect, the at least two metal rings are stainless steel metal rings.

According to one aspect, the at least two fire proof shells are removably attached to each other by means of associated shell clamps.

According to one aspect, the at least one gasket is removably attached to the firewall arrangement by means of associated quick release fasteners, in particular quick release quarter turn fasteners.

According to one aspect, the firewall arrangement further comprises at least a front firewall and a rear firewall which are interconnected via a mid firewall, wherein the at least one gasket is removably attached to the front firewall.

According to one aspect, the at least two fire proof shells overlap the ring-shaped flexible fire proof bellows at least partly.

According to one aspect, the ring-shaped flexible fire proof bellows is attached to an associated counterpart of the at least one aircraft engine by means of mushroom head pins.

BRIEF DESCRIPTION OF THE DRAWINGS

Preferred embodiments of the disclosure are outlined by way of example in the following description with reference to the attached drawings. In these attached drawings, identical or identically functioning components and elements are labelled with identical reference numbers and characters and are, consequently, only described once in the following description.

DETAILED DESCRIPTION

Figure 1:
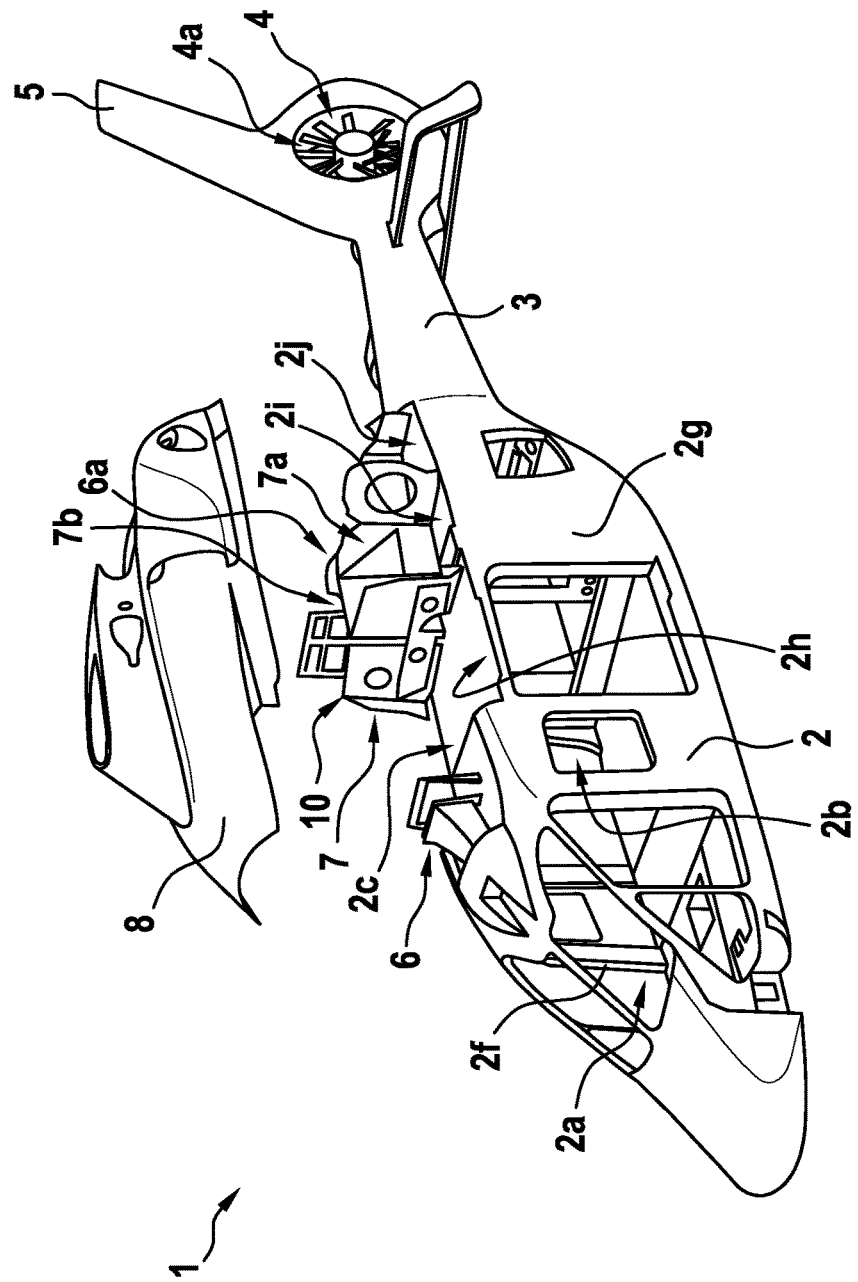
FIG. 1 shows a perspective view of a rotary wing aircraft with an engine accommodating region that is covered by a cowling and provided with a firewall arrangement.

FIG. 1 shows a rotary wing aircraft 1 that is exemplarily illustrated as a helicopter. Thus, for purposes of simplicity and clarity, the rotary wing aircraft 1 is hereinafter referred to as the "helicopter 1".

Preferably, the helicopter 1 comprises at least one multi-blade main rotor for providing lift and forward or backward thrust during operation. The at least one multi-blade main rotor preferentially comprises a plurality of rotor blades that are mounted at an associated rotor head to a rotor shaft, which rotates in operation of the helicopter around an associated rotor axis. Furthermore, the helicopter 1 comprises a landing gear, such as e.g., a skid-type or wheel-type landing gear. However, for simplicity and clarity of the drawing, illustration of the at least one multi-blade main rotor and the landing gear, as well as of other components that would only unnecessarily complicate the drawing, is omitted.

The helicopter 1 illustratively comprises a fuselage 2 that forms an aircraft interior region 2a, 2b. The aircraft interior region 2a, 2b preferably accommodates at least a cockpit 2a and may further accommodate a cabin 2b for passengers and/or cargo. By way of example, a tail boom 3 is connected to the fuselage 2 of the helicopter 1.

The helicopter 1 illustratively further comprises at least one preferentially shrouded counter-torque device 4 configured to provide counter-torque during operation, i.e., to counter the torque created by rotation of the at least one multi-blade main rotor for purposes of balancing the helicopter 1 in terms of yaw. The at least one counter-torque device 4 is illustratively provided at an aft section of the tail boom 3 and preferably comprises a tail rotor 4a. The aft section of the tail boom 3 preferably further comprises a fin 5.

According to one aspect, the fuselage 2 comprises an upper primary skin 2c that separates the aircraft interior region 2a, 2b from an aircraft upper deck 6 arranged above the fuselage 2. In other words, the upper primary skin 2c forms an upper end of the fuselage 2.

Illustratively, the upper primary skin 2c includes a front deck skin 2h, an engine deck skin 2i, and a rear deck skin 2j. The engine deck skin 2i is associated with an engine deck 6a that is part of the aircraft upper deck 6 and that illustratively forms an engine accommodating region 7 with a firewall arrangement 10 that is further described below at FIG. 2. By way of example, the engine accommodating region 7 comprises two separate engine accommodating compartments 7a, 7b.

Preferably, the engine accommodating region 7 accommodates at least one aircraft engine within the firewall arrangement 10 such that the firewall arrangement 10 defines a fire proof separation and a flammable fluids tightness at least between the at least one aircraft engine and the aircraft interior region 2a, 2b. The illustrated realisation refers, by way of example, to a twin-engine configuration wherein one aircraft engine is accommodated in each one of the two separate engine accommodating compartments 7a, 7b.

It should be noted that the firewall arrangement 10 preferably defines a fire proof separation and a flammable fluids tightness not only between at least one aircraft engine and the aircraft interior region 2a, 2b of FIG. 1, but also between the at least one aircraft engine and other adjacent aircraft regions. Such other adjacent aircraft regions include e.g., forward and aft regions to the engine accommodating region 7, such as e.g., gearbox or exhaust accommodating regions.

Illustratively, the engine accommodating region 7 and, more generally, the aircraft upper deck 6 is covered by a cowling 8 that is mounted on top of the fuselage 2. Preferably, the fuselage 2 includes side shells 2f, 2g which illustratively encase the aircraft interior region 2a, 2b and which are mounted to interconnected frames and longitudinal beams to form a primary structure of the helicopter 1 that is designed and adapted for global load carrying duties. Thus, the fuselage's upper primary skin 2c is also involved in these global load carrying duties and, consequently, contributes to global load carrying of the fuselage 2.

Figure 2:
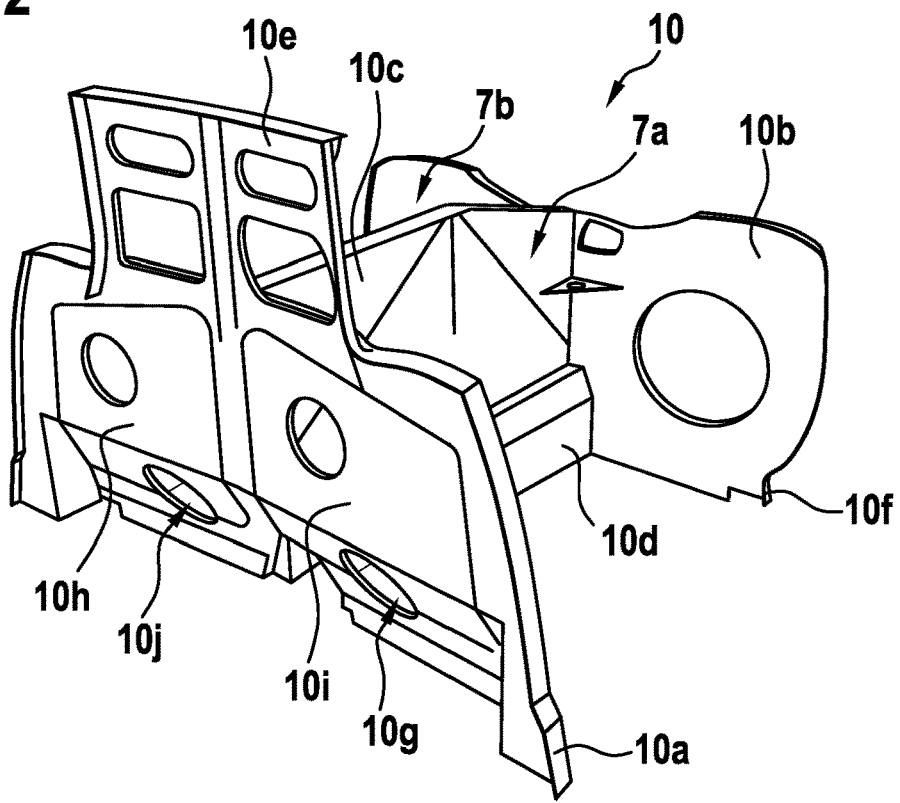
FIG. 2 shows a perspective view of the firewall arrangement of FIG. 1.

FIG. 2 shows the firewall arrangement 10 of FIG. 1, which preferably includes at least a front firewall 10a and a rear firewall 10b. Illustratively, the firewall arrangement 10 further includes a mid firewall 10c.

It should be noted that the mid firewall 10c is provided by way of example to create the two engine accommodating compartments 7a, 7b of FIG. 1, which are required in twin-engine configurations as described above, such that each aircraft engine may be accommodated separately in an associated one of the two engine accommodating compartments 7a, 7b. In contrast, in single engine configurations provision of the mid firewall 10c may be omitted.

Preferably, each one of the front firewall 10a, the rear firewall 10b, and the mid firewall 10c comprises a fire proof material, including at least one of titanium, steel, ceramics, a polymeric composite, or a hybrid organic-inorganic composite. In one realization, at least one of the front firewall 10a, the rear firewall 10b, or the mid firewall 10c has a titanium sheet with a minimum thickness of at least 0.4 mm, preferably with a thickness in a range from 0.6 mm to 0.8 mm, preferentially with a thickness of 1.2 mm.

By way of example, the mid firewall 10c, but also the front firewall 10a and the rear firewall 10b, form a channel 10d that is adapted for accommodating at least partly a tail rotor drive shaft passing through the engine deck 6a of FIG. 1. Furthermore, the front firewall 10a is illustratively provided with an upper extension 10e and the rear firewall 10b is provided with a rear cover 10f.

Illustratively, the front firewall 10a further comprises two removable panels 10h, 10i. The removable panel 10i is associated with the engine accommodating compartment 7a, and the removable panel 10h is associated with the engine accommodating compartment 7b. The removable panels 10i, 10h are removable from the front firewall 10a in order to permit access to respective aircraft engines accommodated in the engine accommodating compartments 7a, 7b.

According to one aspect, at least one and, illustratively, two gaskets 10g, 10j are removably mounted to the front firewall 10a. Each gasket 10g, 10j is preferably provided for tightening pass-through of an associated torque tube, as described in detail below at FIG. 7.

Again, it should be noted that the two removable panels 10i, 10h, and the two gaskets 10g, 10j are only required in twin-engine configurations. In other words, in single engine configurations a single removable panel and a single gasket may be sufficient.

Figure 3:
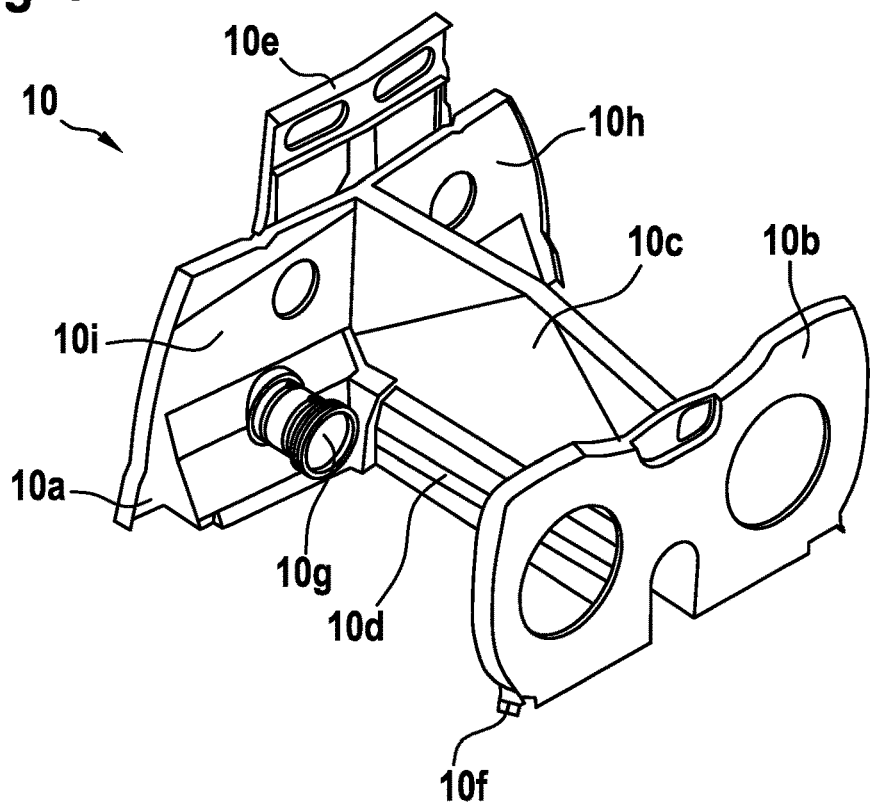
FIG. 3 shows another perspective view of the firewall arrangement of FIG. 1 with a gasket.

FIG. 3 shows the firewall arrangement 10 of FIG. 1 and FIG. 2. The firewall arrangement 10 illustratively includes the front firewall 10a, the rear firewall 10b, the mid firewall 10c, the channel 10d, the upper extension 10e, the rear cover 10f, the removable panels 10h, 10i, and the gasket 10g according to FIG. 2, while the gasket 10j is not visible in FIG. 3. The gasket 10g is preferably removably attached to the front firewall 10a and, illustratively, at least partly to the removable panel 10i, and further described hereinafter at FIG. 4 to FIG. 6.

Figure 4:
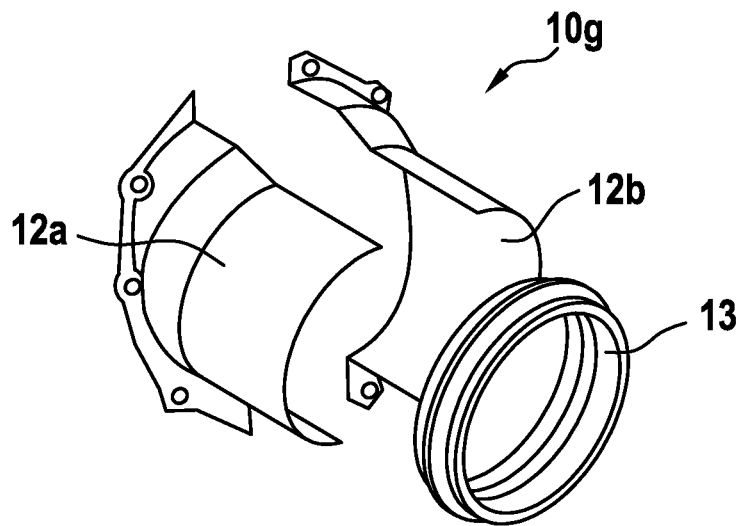
FIG. 4 shows an exploded view of the gasket of FIG. 3.

FIG. 4 shows the gasket 10g of FIG. 3. By way of example, only the gasket 10g is described in detail hereinafter as a representative realisation of both gaskets 10g, 10j of FIG. 2.

According to one aspect, the gasket 10g comprises at least two fire proof shells and a ring-shaped flexible fire proof bellows 13. By way of example, two fire proof shells 12a, 12b are illustrated.

Preferably, at least one of the two fire proof shells 12a, 12b comprises titanium. Illustratively, the at least one of the two fire proof shells 12a, 12b is a semi-cylindrical titanium shell.

Figure 5:
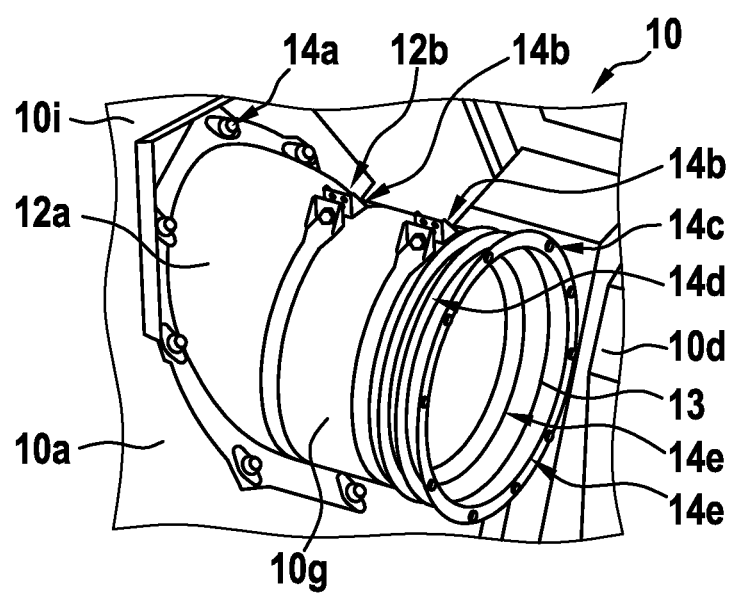
FIG. 5 shows an enlarged detail of FIG. 3.

FIG. 5 shows the gasket 10g of FIG. 4, as well as the channel 10d and the front firewall 10a with the removable panel 10i of the firewall arrangement 10 of FIG. 2 and FIG. 3. Preferably, the gasket 10g is removably attached to the firewall arrangement 10 and, more specifically, to the front firewall 10a by means of associated quick release fasteners 14a. Illustratively, the gasket 10g is at least partly removably attached to the removable panel 10i. The quick release fasteners 14a may e.g., be implemented by quick release quarter turn fasteners and, more generally, by any suitable camlock fixations.

According to FIG. 4, the gasket 10g comprises the two fire proof shells 12a, 12b and the ring-shaped flexible fire proof bellows 13. The two fire proof shells 12a, 12b are removably attached to each other to form a tube-shaped structure. Preferably, the two fire proof shells 12a, 12b are removably attached to each other by means of associated shell clamps 14b, illustratively by means of two shell clamps 14b. The shell clamps 14b may be realised by any suitable clamp-type fasteners.

The ring-shaped flexible fire proof bellows 13 is illustratively mounted to the two fire proof shells 12a, 12b. Preferably, the ring-shaped flexible fire proof bellows 13 comprises at least two metal rings 14e to form a ring-shaped bellows structure. The at least two metal rings 14e may be stainless steel metal rings. However, metal rings other than stainless steel metal rings, such as e.g., titanium metal rings, are likewise contemplated.

Illustratively, the ring-shaped flexible fire proof bellows 13 further comprises a mushroom-type fixation 14c. By way of example, the mushroom-type fixation 14c is implemented by means of a plurality of mushroom head pins.

Preferably, the ring-shaped flexible fire proof bellows 13 comprises a fiber reinforced fabric 14d. The fiber reinforced fabric may e.g., be a silicone coated glass fiber fabric.

Figure 6:
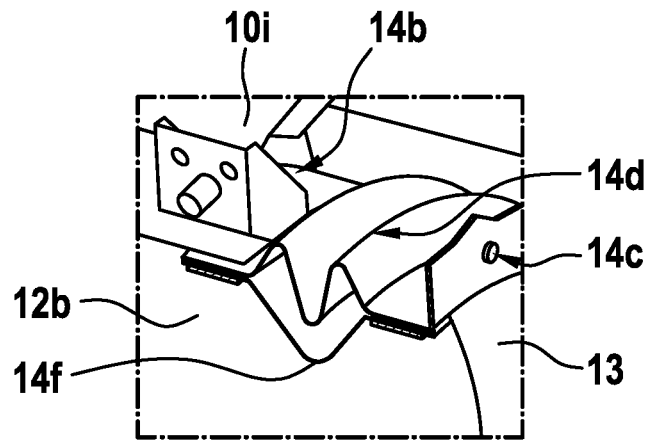
FIG. 6 shows a sectional view of an enlarged detail of FIG. 5.

FIG. 6 shows the front firewall 10i with the fire proof shell 12b and the ring-shaped flexible fire proof bellows 13 of FIG. 5. The ring-shaped flexible fire proof bellows 13 comprises the mushroom-type fixation 14c and the fiber reinforced fabric 14d. Preferably, the ring-shaped flexible fire proof bellows 13 forms an additional fire barrier 14f. Furthermore, one of the shell clamps 14b of the gasket 10g is illustrated.

Figure 7:
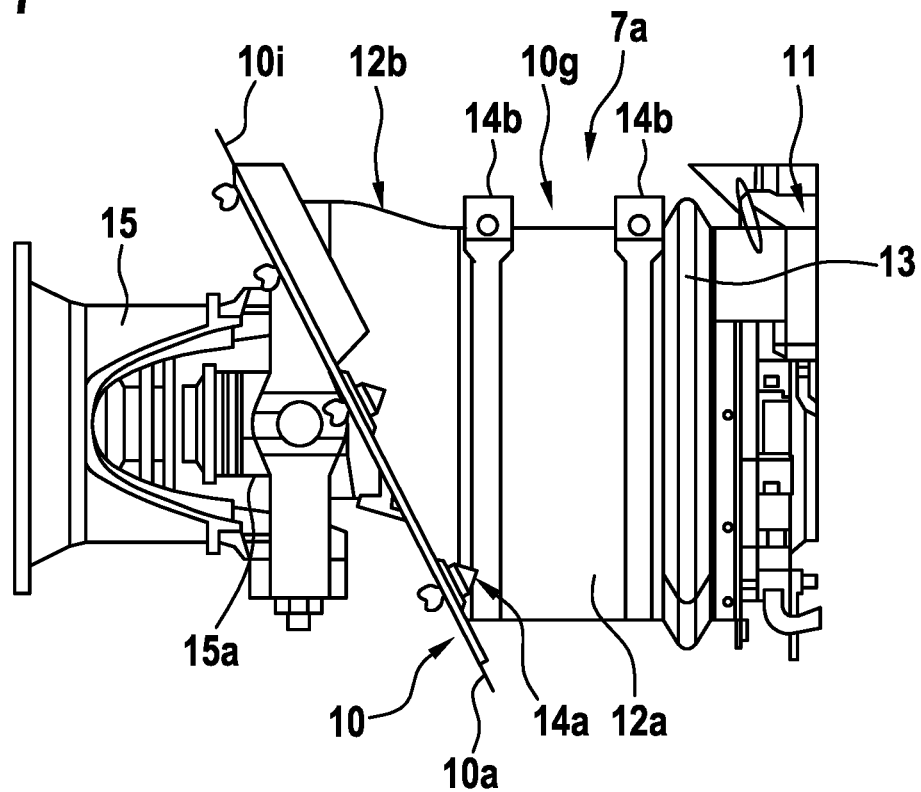
FIG. 7 shows a side view of an enlarged detail of FIG. 3 with a torque tube and an aircraft engine.

FIG. 7 shows the gasket 10g of FIG. 4 to FIG. 6, which preferably forms a flammable fluids barrier and is configured to provide a fire proof segregation and thermal isolation of a torque tube 15 of the helicopter 1 of FIG. 1 from at least one aircraft engine 11 of the helicopter 1. The torque tube 15 preferably connects the at least one aircraft engine 11 to a main gear box of the helicopter 1 and illustratively comprises a drive shaft 15a that transmits torque from the at least one aircraft engine 11 to the main gear box.

Preferably, the aircraft engine 11 is embodied as an air breathing propulsion gas turbine, which combusts a fuel/air mix for power generation. However, any other suitable engine type, such as e.g., electrical engines, is likewise contemplated. The aircraft engine 11 may be mounted to associated engine mounts provided in an associated engine compartment, i.e., engine accommodating compartment 7a of FIG. 1.

However, the aircraft engine 11 and the associated engine mounts are not described in detail and only a small section of the aircraft engine 11 is schematically shown without further detail. In fact, the aircraft engine 11 and the associated engine mounts may be implemented by an engine and engine mounts that are well-known to the person skilled in the art so that a detailed description thereof can be omitted, for brevity and conciseness.

This applies likewise to the torque tube 15 and the drive shaft 15a. In fact, suitable torque tubes and drive shafts that may be used to implement the torque tube 15 and the drive shaft 15a are also well-known to the person skilled in the art so that a detailed description thereof can also be omitted, for brevity and conciseness.

Illustratively, the torque tube 15 is at least partly accommodated in, i.e., surrounded by, the gasket 10g. In other words, the gasket 10g, which comprises the two fire proof shells 12a, 12b and the ring-shaped flexible fire proof bellows 13 of FIG. 5, forms a tube- or sleeve-shaped structure, i.e., a cuff-like structure, which surrounds and accommodates at least partly the torque tube 15.

By way of example, the gasket 10g is removably attached to the firewall arrangement 10 and, more specifically, to the front firewall 10a by means of the associated quick release fasteners 14a of FIG. 5. Illustratively, the gasket 10g is at least partly removably attached to the removable panel 10i of the front firewall 10a. Thus, the gasket 10g tightens pass-through of the torque tube 15 through the front firewall 10a. In this configuration, the ring-shaped flexible fire proof bellows 13 of the gasket 10g is configured to compensate movements of the torque tube 15 relative to the firewall arrangement 10. Furthermore, the gasket 10g illustratively comprises the two shell clamps 14b of FIG. 5, which clamp together the two fire proof shells 12a, 12b.

Figure 8:
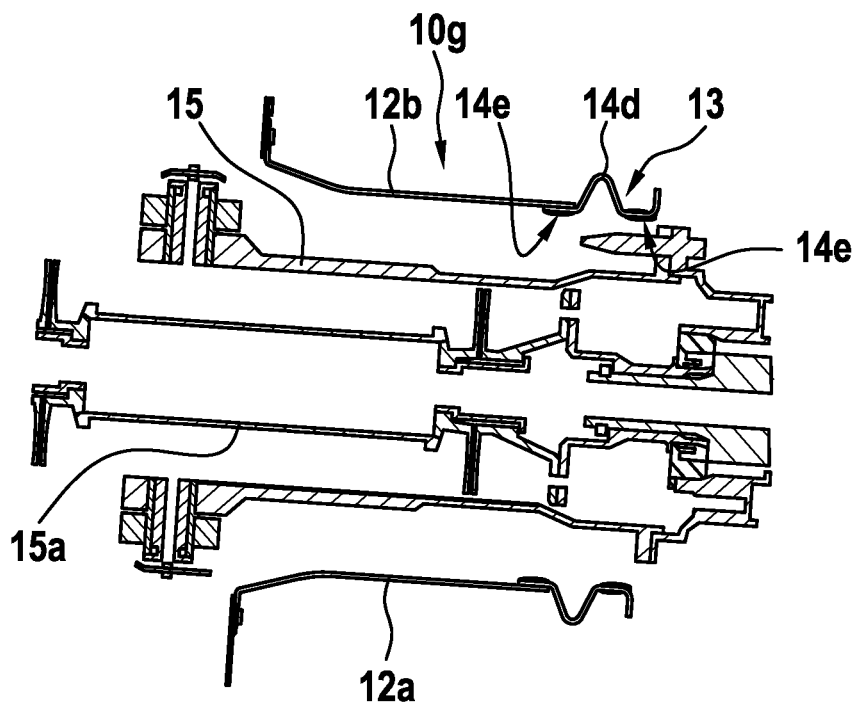
FIG. 8 shows a sectional view of an enlarged detail of FIG. 3 with the torque tube of FIG. 7.

FIG. 8 shows the gasket 10g of FIG. 4 to FIG. 7 which accommodates, i.e., surrounds, at least partly the torque tube 15 with the drive shaft 15a of FIG. 7. The gasket 10g comprises the two fire proof shells 12a, 12b and the ring-shaped flexible fire proof bellows 13 which comprises the fiber reinforced fabric 14d.

Illustratively, the ring-shaped flexible fire proof bellows 13 is mounted by means of at least one of the at least two metal rings 14e of FIG. 5 in an overlapping manner to the two fire proof shells 12a, 12b, as described in detail below at FIG. 10. In other words, the at least two fire proof shells 12a, 12b preferably overlap the ring-shaped flexible fire proof bellows 13 at least partly.

Figure 9:
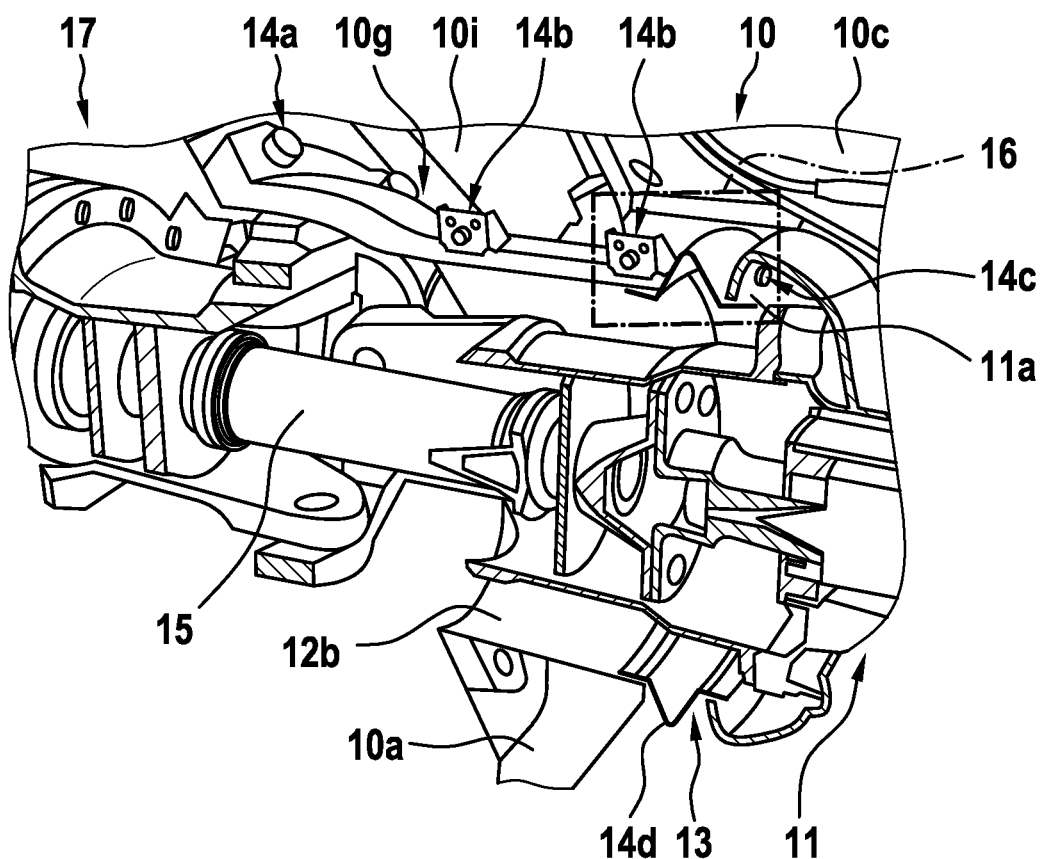
FIG. 9 shows a sectional view of an enlarged detail of FIG. 3 with the torque tube and the aircraft engine of FIG. 7.

FIG. 9 shows the firewall arrangement 10 with the front firewall 10a, the removable panel 10i, and the mid firewall 10c of FIG. 3, as well as the gasket 10g of FIG. 4 to FIG. 9 with the two shell clamps 14b of FIG. 5. The gasket 10g accommodates, i.e., surrounds, at least partly the torque tube 15 that connects the at least one aircraft engine 11 of FIG. 7 to a main gear box 17 of the helicopter 1 of FIG. 1.

However, the main gear box 17 is not described in detail and only a small section thereof is schematically shown without further detail. In fact, the main gear box 17 may be implemented by a main gear box that is well-known to the person skilled in the art so that a detailed description thereof can be omitted, for brevity and conciseness.

FIG. 9 further illustrates the fire proof shell 12b and the ring-shaped flexible fire proof bellows 13 of FIG. 5 to FIG. 8. By way of example, the fire proof shell 12b is removably attached to the front firewall 10a and, at least partly, to the removable panel 10i by means of the quick release fasteners 14a of FIG. 5. The ring-shaped flexible fire proof bellows 13 illustratively comprises the mushroom-type fixation 14c and the fiber reinforced fabric 14d of FIG. 5. The mushroom-type fixation 14c illustratively attaches the ring-shaped flexible fire proof bellows 13 to an associated counterpart 11a of the at least one aircraft engine 11 in a connection region 16.

Figure 10:
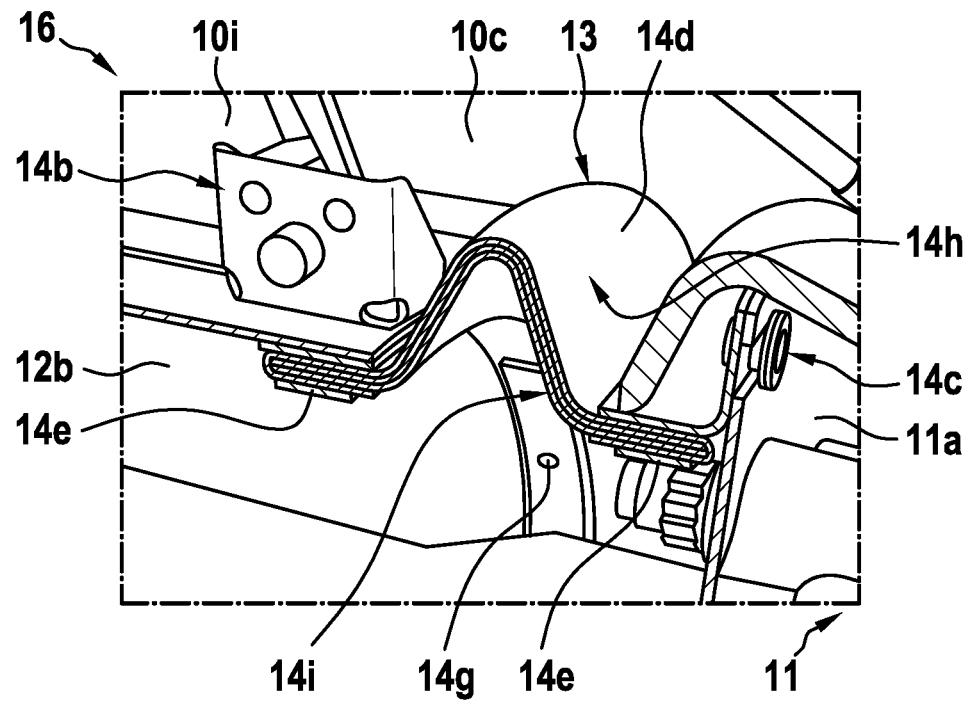
FIG. 10 shows an enlarged detail of FIG. 3.

FIG. 10 shows the connection region 16 of FIG. 9 for further illustrating the fire proof shell 12b with the shell clamp 14b, and the ring-shaped flexible fire proof bellows 13, as well as the attachment of the ring-shaped flexible fire proof bellows 13 to the associated counterpart 11a of the at least one aircraft engine 11 by means of the mushroom-type fixation 14c. More specifically, FIG. 10 clarifies overlapping of the ring-shaped flexible fire proof bellows 13 with the fire proof shell 12b, to which the ring-shaped flexible fire proof bellows 13 is illustratively mounted by means of at least one of the at least two metal rings 14e of FIG. 5. Illustratively, the at least one of the at least two metal rings 14e is removably mounted to the fire proof shell 12b via associated fasteners 14g, in particular rivets. By way of example, the at least one of the at least two metal rings 14e may be fastened to the shell clamp 14b.

Illustratively, the ring-shaped flexible fire proof bellows 13 comprises the fiber reinforced fabric 14d of FIG. 9. Preferably, the fiber reinforced fabric 14d comprises at least one silicone coated glass fiber fabric layer 14h. The at least one silicone coated glass fiber fabric layer 14h is preferentially an outer layer of the gasket 10g that faces the at least one aircraft engine 11.

Furthermore, the fiber reinforced fabric 14d preferably comprises at least one silicate glass fiber fabric layer 14i. The at least one silicate glass fiber fabric layer 14i preferentially faces the torque tube 15 of FIG. 9.

It should be noted that modifications to the above described embodiments are within the common knowledge of the person skilled in the art and, thus, also considered as being part of the present disclosure. It should further be noted that the drawings are only intended for schematically representing embodiments of the present disclosure and not for showing detailed constructions thereof.

REFERENCE LIST 1 rotary wing aircraft
fuselage
2a cockpit
2b cabin
2c upper primary skin of fuselage
2f, 2g fuselage side shells
2h front deck skin
2i engine deck skin
2j rear deck skin
3 tail boom
4 counter-torque device
4a tail rotor
5 fin
6 aircraft upper deck 6a engine deck
7 engine accommodating region
7a, 7b engine accommodating compartments
8 cowling
10 firewall arrangement
10a front firewall
10b rear firewall
10c mid firewall
10d tail rotor drive shaft channel
10e front firewall upper extension
10f rear cover
10g, 10j gaskets
10h, 10i front firewall removable panels
11 aircraft engine
11a engine counterpart
12a, 12b gasket half-shells
13 gasket bellows
14a camlock fixations
14b shell clamps
14c mushroom-type fixation
14d bellows fiber fabric
14e metal rings
14f additional fire barrier
14g rivets
14h bellows outer layer
14i bellows inner layer
15 torque tube
15a drive shaft
16 connection region
17 main gear box

What is claimed is:

1. A rotary wing aircraft comprising:
a fuselage that forms an aircraft interior region, the fuselage comprising an upper primary skin that separates the aircraft interior region from an aircraft upper deck arranged above the fuselage;
a firewall arrangement comprising a front firewall;
wherein the aircraft upper deck comprises an engine accommodating region with the firewall arrangement arranged therein, the engine accommodating region comprising an engine accommodating compartment bounded in part by the firewall arrangement, the engine accommodating region accommodating at least one aircraft engine within the engine accommodating compartment such that the firewall arrangement defines a fire proof separation and a flammable fluids tightness at least between the at least one aircraft engine and the aircraft interior region;
the firewall arrangement comprises within the engine accommodating compartment at least one gasket, the at least one gasket being removably attached within the engine accommodating compartment to the front firewall for tightening pass-through, through the front firewall, of a torque tube that connects the at least one aircraft engine to a main gear box of the rotary wing aircraft that is outside of the engine accommodating compartment; and
the at least one gasket comprises at least two fire proof shells that are removably attached to each other to form a tube-shaped structure for accommodating therein the torque tube, and a ring-shaped flexible fire proof bellows which forms a cuff-like structure for accommodating therein the torque tube and that is removably mounted to the at least two fire proof shells and configured to compensate movements of the torque tube relative to the firewall arrangement, the ring-shaped flexible fire proof bellows being attached within the engine accommodating compartment to an associated counterpart of the at least one aircraft engine by mushroom head pins.

2. The rotary wing aircraft of claim 1 wherein the at least one gasket forms a flammable fluids barrier and is configured to provide a fire proof segregation and thermal isolation of the torque tube from the at least one aircraft engine.

3. The rotary wing aircraft of claim 1 wherein at least one of the at least two fire proof shells comprises titanium.

4. The rotary wing aircraft of claim 3 wherein the at least one of the at least two fire proof shells is a semi-cylindrical titanium shell.

5. The rotary wing aircraft of claim 1 wherein the ring-shaped flexible fire proof bellows comprises a fiber reinforced fabric.

6. The rotary wing aircraft of claim 5 wherein the fiber reinforced fabric comprises at least one silicone coated glass fiber fabric layer.

7. The rotary wing aircraft of claim 5 wherein the fiber reinforced fabric comprises at least one silicate glass fiber fabric layer.

8. The rotary wing aircraft of claim 1 wherein the ring-shaped flexible fire proof bellows comprises at least two metal rings to form a ring-shaped bellows structure.

9. The rotary wing aircraft of claim 8 wherein at least one of the at least two metal rings is removably mounted to the at least two fire proof shells via associated fasteners.

10. The rotary wing aircraft of claim 8 wherein the at least two metal rings are stainless steel metal rings.

11. The rotary wing aircraft of claim 1 wherein the at least two fire proof shells are removably attached to each other by means of associated shell clamps.

12. The rotary wing aircraft of claim 1 wherein the at least one gasket is removably attached to the front firewall of the firewall arrangement by means of associated quick release fasteners.

13. The rotary wing aircraft of claim 12 wherein the firewall arrangement further comprises at least a rear firewall and a mid firewall, the front firewall and the rear firewall are interconnected via the mid firewall.

14. The rotary wing aircraft of claim 1 wherein the at least two fire proof shells overlap the ring-shaped flexible fire proof bellows at least partly.

15. The rotary wing aircraft of claim 1 wherein each of the at least two fire proof shells has a partial tubular circumference, and the partial tubular circumferences of the at least two fire proof shells removably attached to each other all together form a complete tubular circumference of the tube-shaped structure.

16. The rotary wing aircraft of claim 15 wherein the ring-shaped flexible fire proof bellows comprises at least two metal rings and a fiber reinforced fabric, the fiber reinforced fabric connecting together the at least two metal rings, and the at least two metal rings otherwise being disconnected from one another.

17. The rotary wing aircraft of claim 16 wherein a first one of the at least two metal rings is removably mounted to the at least two fire proof shells for the ring-shaped flexible fire proof bellows to be removably mounted to the at least two fire proof shells, and a second one of the at least two metal rings is attached to the associated counterpart of the at least one aircraft engine by the mushroom head pins for the ring-shaped flexible fire proof bellows to be attached within the engine accommodating compartment to the associated counterpart of the at least one aircraft engine.

18. The rotary wing aircraft of claim 17 wherein the at least two fire proof shells at least partly overlap the first one of the at least two metal rings removably mounted to the at least two fire proof shells.

19. The rotary wing aircraft of claim 16 wherein the fiber reinforced fabric comprises a silicone coated glass fiber fabric layer and/or a silicate glass fiber fabric layer.

20. The rotary wing aircraft of claim 1 wherein the ring-shaped flexible fire proof bellows comprises at least two metal rings and a fabric layer, the fabric layer connecting together the at least two metal rings, and the at least two metal rings otherwise being disconnected from one another.

* * * * *